(12) United States Patent
Chang et al.

(10) Patent No.: US 12,744,880 B2
(45) Date of Patent: Sep. 22, 2026

(54) METHOD FOR OBTAINING THE OPTICAL PROJECTION MECHANISM OF A CAMERA

(71) Applicant: Chuan-Jan Chang, New Taipei City (TW)

(72) Inventors: Chuan-Jan Chang, New Taipei City (TW); Jin-Wei Liang, New Taipei City (TW); Yen-Hsun Wang, New Taipei City (TW); Cheng-Yu Li, New Taipei City (TW); Haryanto Haryanto, New Taipei City (TW); Chao-Chun Chang, New Taipei City (TW)

(73) Assignee: Chuan-Jan Chang, New Taipei City (TW)

( * ) Notice: Subject to any disclaimer, the term of this patent is extended or adjusted under 35 U.S.C. 154(b) by 0 days.

(21) Appl. No.: 19/145,929

(22) PCT Filed: Jan. 9, 2023

(86) PCT No.: PCT/CN2023/071231

§ 371 (c)(1),
(2) Date: Jul. 5, 2025

(87) PCT Pub. No.: WO2024/148454

PCT Pub. Date: Jul. 18, 2024

(65) Prior Publication Data

US 2026/0214200 A1 Jul. 23, 2026

(51) Int. Cl.
*H04N 17/00* (2006.01)
*G03B 37/00* (2021.01)
(Continued)

(52) U.S. Cl.
CPC .......... *H04N 17/002* (2013.01); *G03B 37/00* (2013.01); *G03B 43/00* (2013.01); *G06T 7/80* (2017.01)

(58) Field of Classification Search
CPC ...... H04N 17/00; H04N 17/02; H04N 17/002; G06T 7/80; G03B 37/00; G03B 43/00
(Continued)

(56) References Cited

U.S. PATENT DOCUMENTS 6,985,183 B2 * 1/2006 Jan ...................... H04N 17/002 359/662
7,042,508 B2 * 5/2006 Jan ...................... G02B 13/06 348/E7.087
(Continued)

*Primary Examiner* — Trang U Tran
(74) *Attorney, Agent, or Firm* — LANWAY IPR SERVICES; Chun-Ming Shih

(57) ABSTRACT

The present invention provides a method for obtaining the optical projection mechanism of a camera, particularly one equipped with a fisheye lens. The method first establishes the camera's optical axis and projection center. A stereoscopic target having a patterned front surface and at least one patterned side surface is placed so that the projection center aligns with the target center and the optical axis is normal to the front surface. Images of the target captured by the camera form a second pattern on the image plane. By correlating the known first pattern on the target with the second pattern on the image plane, viewing lines across the full field of view—including off-axis angles exceeding 90°—are derived, yielding an accurate mapping between image coordinates and real-world directions. The resulting projection model enables precise distortion correction and dimensional measurement across the camera's wide field of view.

8 Claims, 10 Drawing Sheets

(51) Int. Cl.
*G03B 43/00* (2021.01)
*G06T 7/80* (2017.01)

(58) Field of Classification Search
USPC .......................................................... 348/180
See application file for complete search history.

(56) References Cited

U.S. PATENT DOCUMENTS

| | | | | |
|---|---|---|---|---|
| 7,202,888 | B2 * | 4/2007 | Tecu | H04N 25/61<br>348/241 |
| 8,547,423 | B2 * | 10/2013 | Ning | G02B 13/04<br>348/65 |
| 10,523,866 | B2 * | 12/2019 | Zhao | G06T 3/047 |
| 11,514,608 | B2 * | 11/2022 | Su | G01B 11/00 |
| 2012/0154586 | A1 * | 6/2012 | Chung | H04N 17/002<br>348/148 |

* cited by examiner

METHOD FOR OBTAINING THE OPTICAL PROJECTION MECHANISM OF A CAMERA

FIELD OF THE DISCLOSURE

The present invention relates to a method for obtaining a camera's optical projection mechanism, and more particularly to a method for analyzing a camera's optical projection mechanism for lenses that exhibit a severely deviated projection mechanism (e.g., a fisheye lens).

BACKGROUND OF THE INVENTION

Currently, fisheye lenses can capture images with a very large field of view, covering a spatial angle that can even exceed a hemispherical field-of-view solid angle. However, compared to human vision, such images come with severe distortion in appearance. Therefore, although the images are distorted, fisheye lenses have still found use in surveillance systems that previously could only monitor the movements of people or objects within a limited range, because the large field of view offers significant benefits. In recent times, camera calibration technology can also handle the wide field of view of fisheye cameras, and thus fisheye cameras have been widely used for observing objects around automobiles. However, there has been no practical progress in applications for identifying the size scale of adjacent real objects or performing dimensional measurements. Therefore, it is very important to understand the projection mechanism of fisheye lenses.

Various methods for transforming fisheye images to match human visual perception have been proposed over the years, as evidenced by numerous patents (for example, U.S. Pat. Nos. 5,185,667; 5,313,306; 5,359,363; 5,384,588, etc.). These patents all operate by assuming the fisheye lens follows a specific projection mechanism and then performing a corresponding correction of the image based on that assumed projection model. However, in practice a given fisheye lens does not necessarily conform to that specific projection mechanism, resulting in limited accuracy of image transformation. Thus, in early products, manufacturers would combine certain fisheye lenses of specified specifications with a selected camera body, achieving a commercially viable system.

However, it is impossible for a fisheye lens to perfectly conform to any one particular projection mechanism. Even if a lens is designed using CAD according to a certain projection logic, the optical refraction properties of materials in production cannot perfectly meet the theoretical specifications. Therefore, once manufactured, the lens typically deviates at least somewhat from the original design expectations. In addition, when an independent fisheye lens is attached to a camera body, slight variances in its optical projection mechanism can affect the quality of the resulting images. Accordingly, if one can test the optical characteristics of a lens after it is assembled with the camera so as to have a more certain reference for its use, its practical value can be greatly increased. This is an issue worth consideration by those skilled in the art.

SUMMARY OF THE INVENTION

The object of the present invention is to provide a method for obtaining a camera's optical projection mechanism. The method according to the present invention can reliably determine the optical projection mechanism of a specific camera, so that images captured by that specific camera can be corrected with high accuracy.

For the above and related objectives, the present invention provides a method for obtaining a camera's optical projection mechanism. The camera includes a lens, and the imaging logic of the camera has the same axisymmetric and nonlinear distortion properties as a typical camera. The camera is adapted to form an image of a physical object in a field-of-view space onto an image plane. First, the optical axis and the projection center of the camera are confirmed in an instrument coordinate system (which is defined by a provided stereoscopic target). The stereoscopic target includes a front view surface and at least one side view surface, wherein both the front view surface and the side view surface have a first pattern. Then, the appearance of the first pattern on the front view surface and the side view surface is imaged by the camera onto the image plane to form a second pattern. Next, the projection center of the camera is aligned with a center point of the front view surface of the stereoscopic target, and the optical axis is made perpendicular to the front view surface. Then, by comparing the first pattern with the second pattern, the corresponding relationship between the first and second patterns is found, thereby obtaining the camera's optical projection mechanism.

In some embodiments, the first pattern is composed of a plurality of regularly arranged shapes (for example, squares).

In some embodiments, the first pattern covers the entire front view surface or side view surface. Here, "covering the entire front or side view surface" does not necessarily mean completely covering the entire surface; covering substantially the entire surface is also included, as shown in FIG. 5.

In some embodiments, the first pattern has a first color and a second color. Each shape is either the first color or the second color, and shapes of the first color and shapes of the second color are arranged in an alternating pattern. For example, the first color may be black and the second color may be white.

In some embodiments, the stereoscopic target is a cubic box having an opening. The interior of the box defines the front view surface and four side view surfaces, and the opening exposes the front view surface and the side view surfaces.

In some embodiments, the camera is equipped with a fisheye lens.

DESCRIPTION OF THE PREFERRED EMBODIMENTS

Reference to the following detailed description and the accompanying drawings will provide a thorough understanding of the present invention. Various embodiments of the invention are described below with reference to the drawings. It should be understood that the detailed description given in connection with these drawings is for illustrative purposes only, and that the invention is not limited to the specific embodiments described. For example, the teachings provided herein and the requirements of particular applications may yield numerous alternative and suitable approaches for implementing the functional details of the invention. Thus, the invention may be practiced in ways that extend beyond the specific embodiments disclosed below.

Figure 1:
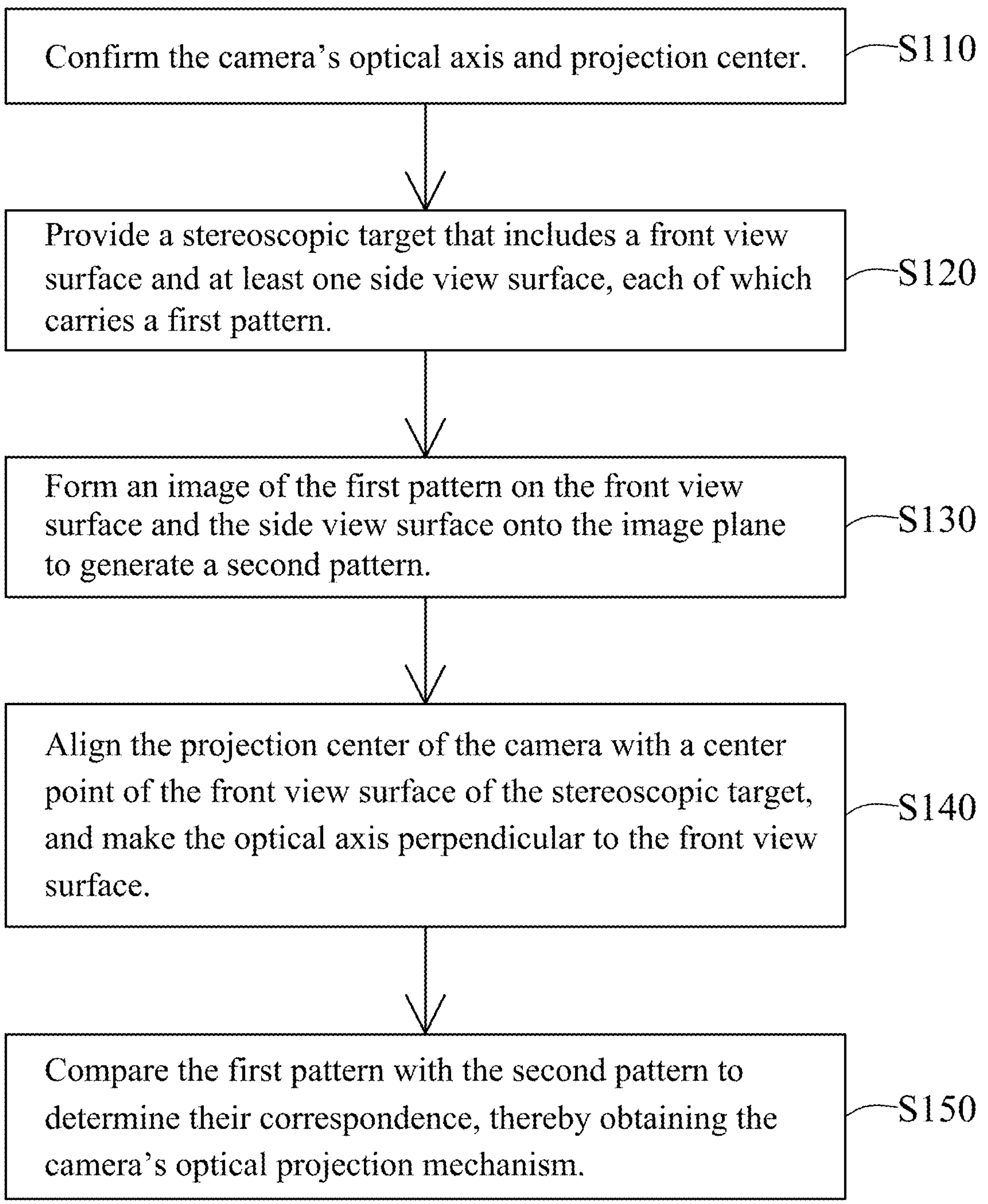
FIG. 1 is a flowchart of a method for obtaining a camera's optical projection mechanism according to an embodiment of the present invention.

Referring to FIG. 1, which depicts a flowchart of an embodiment, the method according to this embodiment can be mainly divided into the following steps:

- S110: confirming the camera's optical axis and projection center;
- S120: providing a stereoscopic target including a front view surface and at least one side view surface, wherein both the front view surface and the side view surface have a first pattern (in one embodiment, the instrument coordinate system mentioned in step S110 is defined based on the stereoscopic target);
- S130: forming an image of the first pattern on the front view surface and the side view surface onto the image plane to create a second pattern;
- S140: aligning the projection center of the camera with a center point of the front view surface of the stereoscopic target, and making the optical axis perpendicular to the front view surface; and
- S150: comparing the first pattern with the second pattern to find the corresponding relationship between the first and second patterns, thereby obtaining the camera's optical projection mechanism.

Step S110: The following is a more detailed explanation of each of the above steps. First, step S110 is described to enable those of ordinary skill in the art to understand how to confirm a camera's optical axis and projection center. It should be noted that an implementation of step S110 has already been described in detail in the inventor's previously filed patents TW 565735, TW 565736, and U.S. Pat. No. 6,985,183, which are hereby incorporated by reference.

In this embodiment, the lens used in the camera is a fisheye lens, which has axisymmetric and nonlinear distortion properties. Compared to other lenses, fisheye lenses exhibit severe barrel distortion; they are often used to produce dramatic or special-effect images, but it is difficult to directly discern an object's true appearance from such an image. However, in engineering practice, the optical projection mechanism of the image formation can still be assumed to follow certain projection rules.

Rule 1: The distortion of an image produced by a fisheye lens on the image plane is centrally symmetric; this central point is referred to as the distortion center (principal point). The optical projection trajectory in the field-of-view space is symmetric about the camera's optical axis.

Rule 2: All object points lying on the same specific viewing line in the field-of-view space are projected to the same point on the image plane. This assumed projection mechanism can be described as follows: in the field-of-view (FOV) space, incoming light rays from objects converge at a unique optical center in space (also called a projection center, or viewpoint VP), and are then refracted in a distributed manner to form an image on the image plane.

Figure 2:
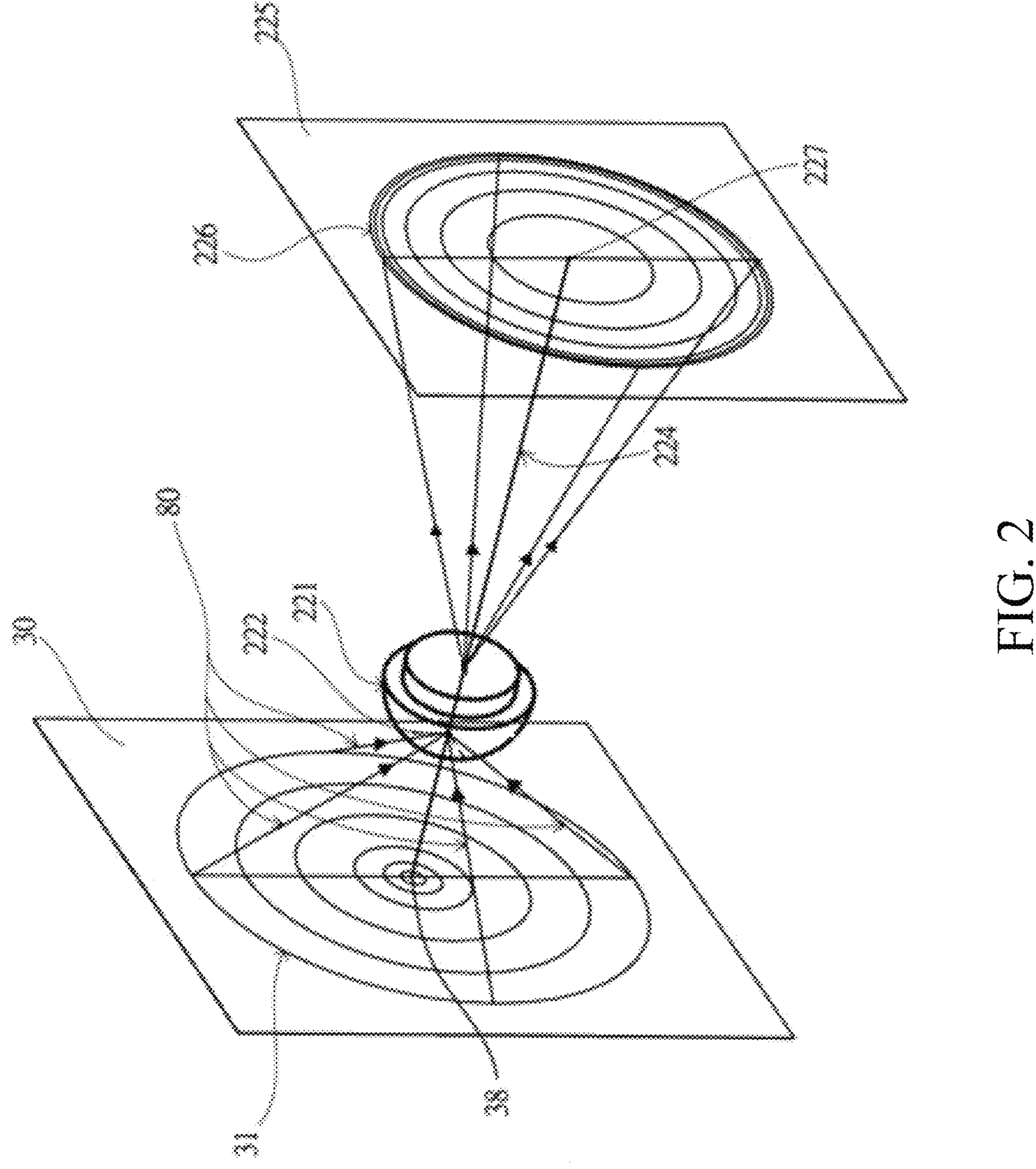
FIG. 2 is a diagram showing a projection light path between a planar target and a fisheye camera in space.
Figure 3:
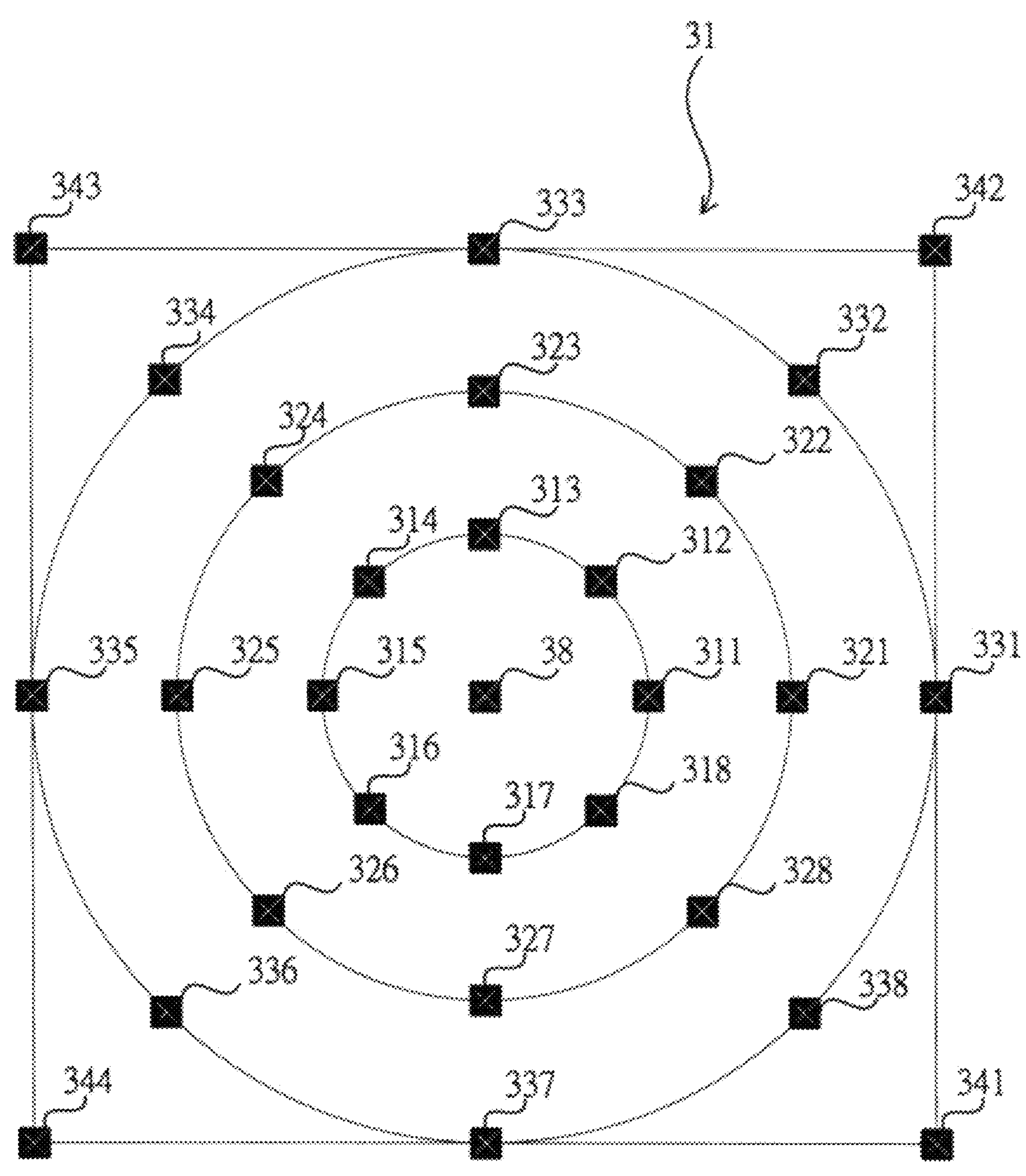
FIG. 3 is an illustration of a planar target having a centrally symmetric pattern.
Figure 4:
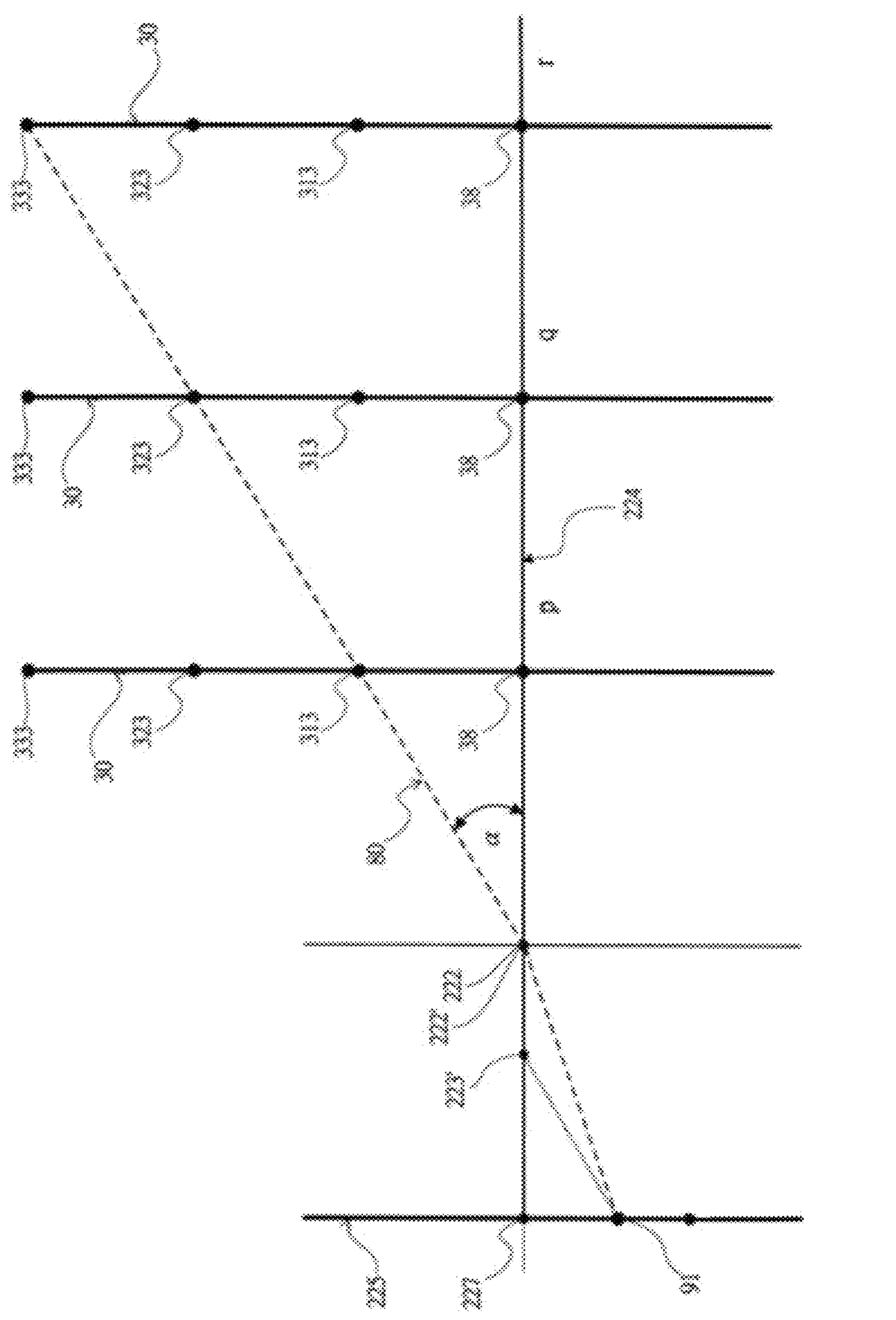
FIG. 4 is a schematic diagram of a projection light path.

In summary, using Rule 1 above, one can find the optical axis 224 of the fisheye camera, and using Rule 2, one can confirm the projection center 222. Next, if one could analyze the viewing line 80 corresponding to any arbitrary coordinate point on the image plane 225, then in theory the imaging geometry of the fisheye camera could be completely described without concern for the fisheye lens's particular projection function. However, relying only on the methods illustrated in FIGS. 2-4 (or in patents TW 565735, TW 565736, and U.S. Pat. No. 6,985,183) it is not possible to determine the viewing line 80 corresponding to an arbitrary coordinate point on the image plane 225. The reason is that a fisheye camera's field of view often approaches or exceeds 180°, but the planar target 30 is finite in size and cannot be used to determine viewing lines 80 for off-axis angles near or exceeding 90°.

Figure 5:
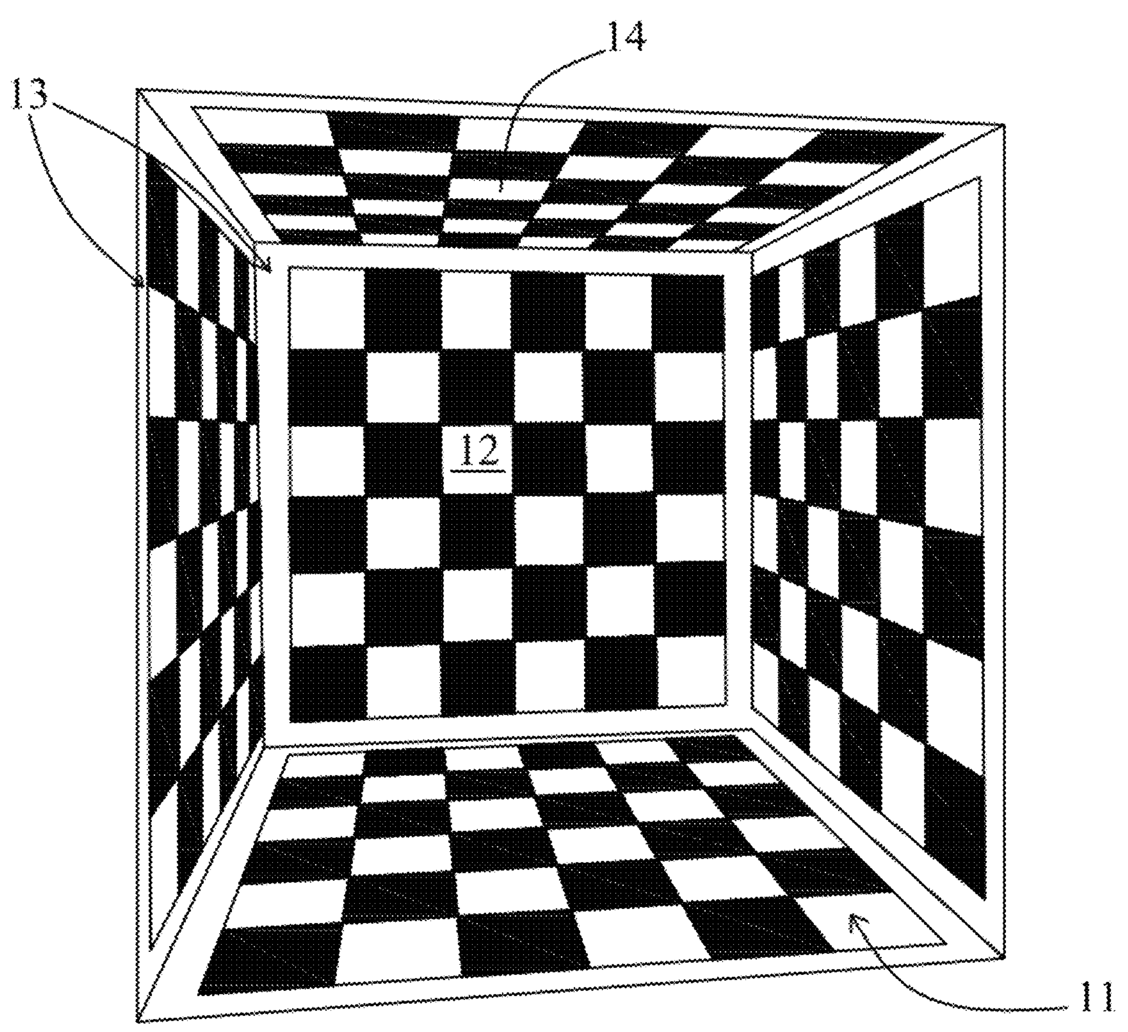
FIG. 5 shows an embodiment of a stereoscopic target according to the present invention.

Therefore, based on the foregoing, the inventor of the present application, building on that embodiment, further calibrates the fisheye camera by providing a stereoscopic target 10 (as shown in FIG. 5) along with a series of additional steps. The following provides a more detailed description of the stereoscopic target 10 and the subsequent steps.

Figure 6:
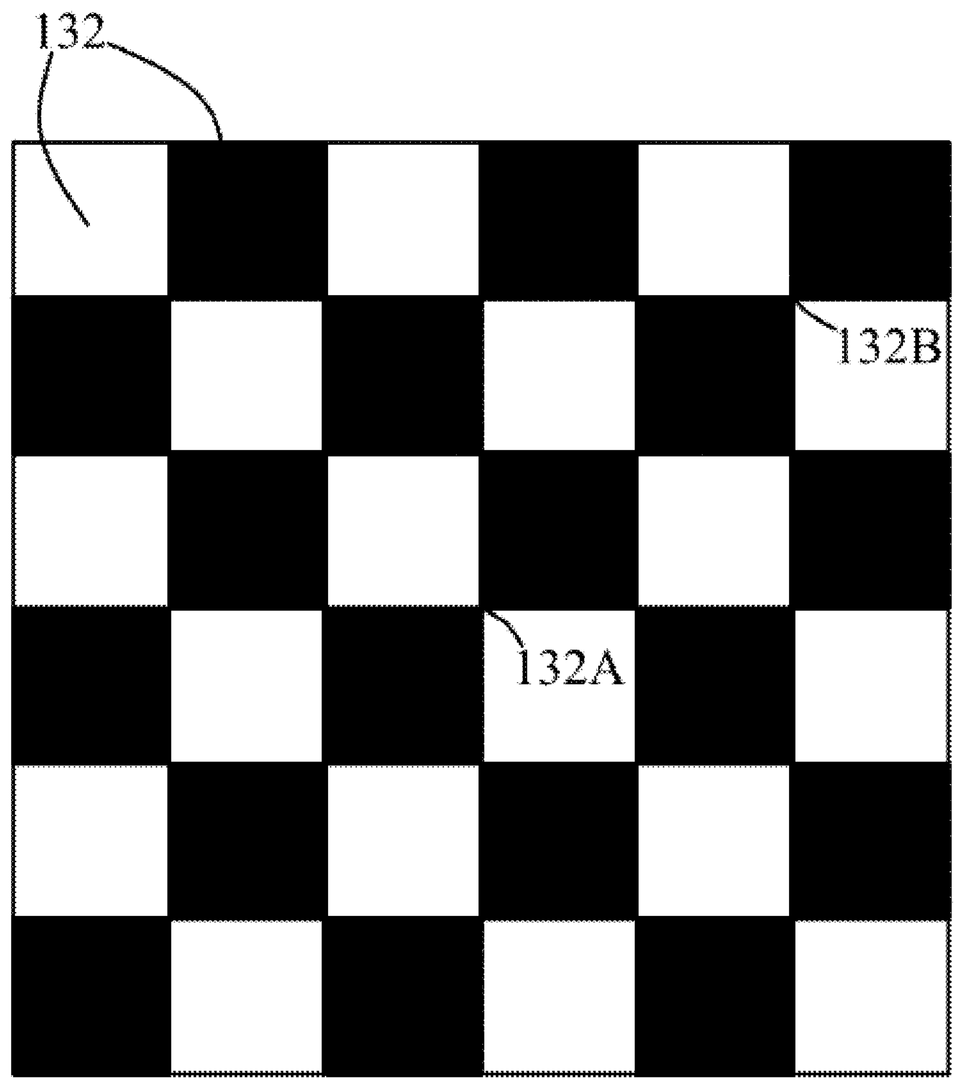
FIG. 6 illustrates an embodiment of the front view surface.
Figure 7:
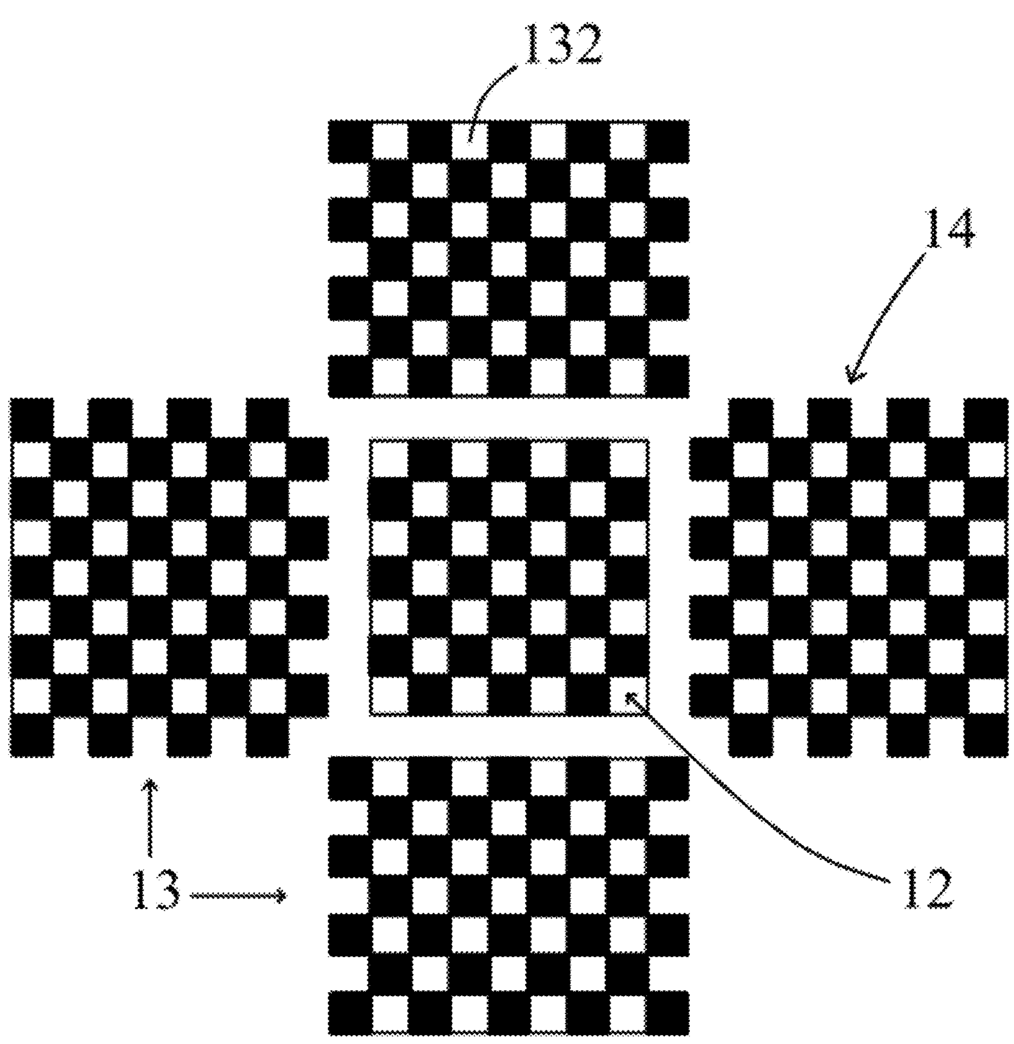
FIG. 7 illustrates a developed (unfolded) view of the stereoscopic target.

Step S120: Please refer to FIG. 1 and FIG. 5 together. FIG. 5 shows an embodiment of a stereoscopic target 10 according to the present invention. In this embodiment, the stereoscopic target 10 is a cubic box and has an opening 11. As shown in FIG. 5, the stereoscopic target 10 includes a front view surface 12 and four side view surfaces 14. Additionally, please refer to FIGS. 5-7: FIG. 6 illustrates an embodiment of the front view surface, and FIG. 7 illustrates an unfolded (flat layout) view of the stereoscopic target 10. In this embodiment, both the front view surface 12 and the four side view surfaces 14 have a first pattern 13. The first pattern 13 covers the entire front view surface 12 and side view surfaces 14, and the first pattern 13 is composed of a plurality of regularly arranged shapes 132, which in this example are squares. Moreover, each shape 132 is either black or white, and the black shapes 132 and white shapes 132 are arranged in an alternating pattern. In addition, in this embodiment the number of shapes 132 in the first pattern 13 is an even number (36 shapes in FIG. 6), and each shape 132 has a side length of, for example, 3 cm.

Figure 8:
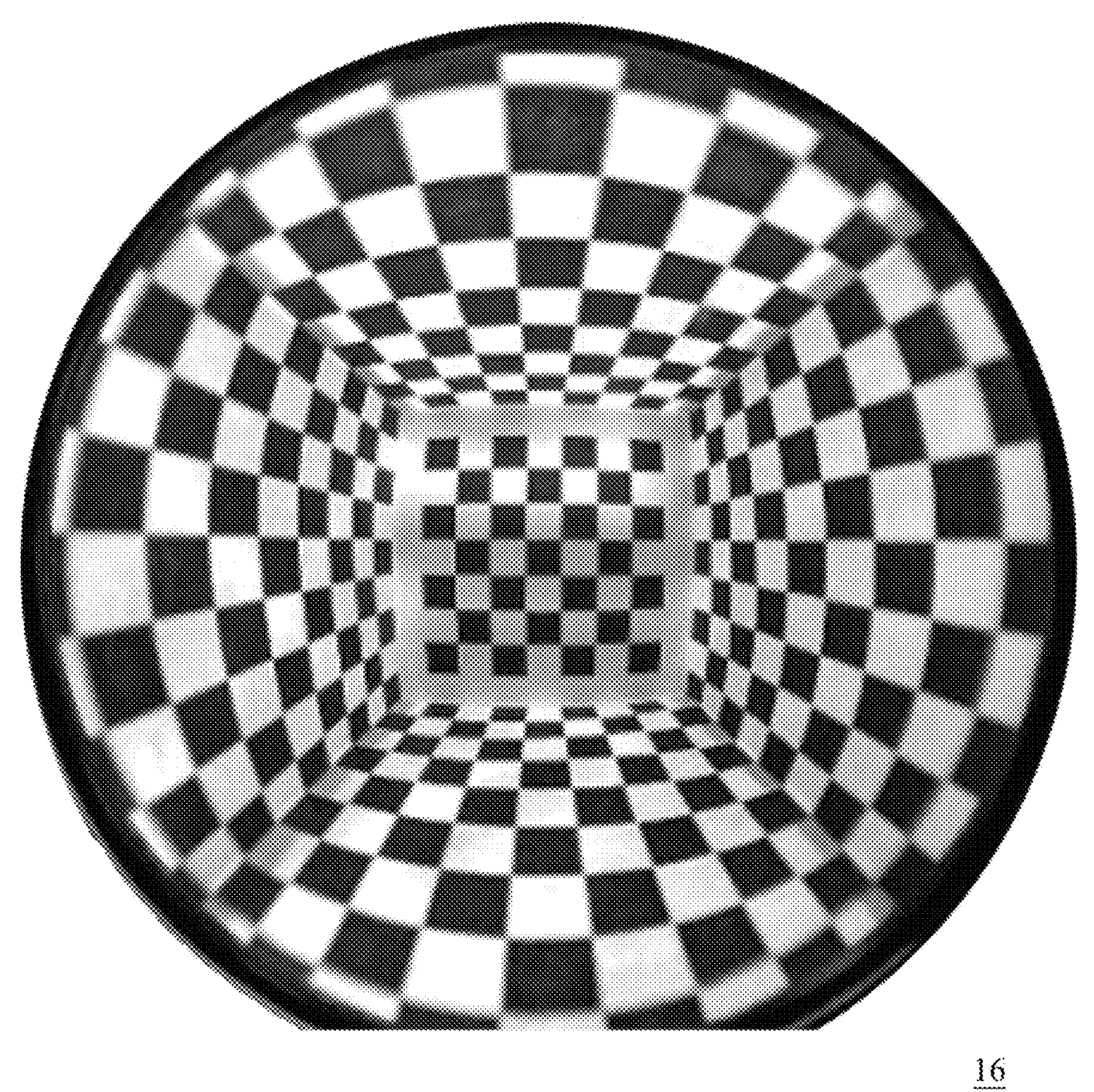
FIG. 8 illustrates a second pattern formed on the image plane.

Step S130: Next, step S130 is performed (please also refer to FIG. 8, which illustrates the second pattern on the image plane). In this embodiment, the camera is moved inward through the opening 11 into the interior of the stereoscopic target 10, and the stereoscopic target 10 is photographed or filmed by the camera. In this way, the first pattern 13 on the front view surface 12 and side view surfaces 14 is imaged onto the image plane 225, thereby forming a second pattern 16.

Step S140: Subsequently, step S140 is executed. The projection center 222 of the camera is aligned with a center point 132A of the front view surface 12 of the stereoscopic target 10, and the optical axis 224 is made perpendicular to the front view surface 12. According to the aforementioned Rule 1, the image captured by the fisheye lens 221 on the image plane 225 is centrally symmetric. Therefore, by adjusting the second pattern 16 to make it centrally symmetric, it is ensured that the optical axis 224 is perpendicular to the front view surface 12. Furthermore, in this embodiment, because the number of shapes 132 in the first pattern 13 is even, the center point 132A of the front view surface 12 lies at the intersection of four shapes 132. Additionally, since the shapes 132 of the first pattern 13 are arranged in alternating black and white, it is easy—whether by human vision or computer recognition—to identify the center point of the second pattern 16.

It is noteworthy that performing step S140 does not necessarily require using the second pattern 16. For example, the camera and the stereoscopic target 10 could both be mounted on fixtures that have been precisely adjusted. In such case, once the camera and the stereoscopic target 10 are installed, the projection center 222 of the camera will automatically be aligned with the center point 132A of the front view surface 12 of the target, and the optical axis 224 will be perpendicular to the front view surface. Therefore, step S140 need not strictly occur after step S130; it could be performed before step S130 in an appropriately calibrated setup.

Step S150: Next, step S150 is carried out (please also refer to FIGS. 5-8). By comparing the first pattern 13 with the second pattern 16, the corresponding relationship between the first pattern 13 and the second pattern 16 is determined, thereby obtaining the camera's optical projection mechanism. In detail, because the size and positions of the shapes 132 in the first pattern 13 are known, one can evaluate the degree of image distortion from the size and positions of the corresponding shapes (denoted 142) in the second pattern 16. Moreover, because the side view surfaces 14 of the stereoscopic target 10 also carry the first pattern 13, even if the fisheye camera's field of view approaches or exceeds 180° (for example, up to 230°), it still falls within the area covered by the first pattern 13. Thus, in theory, any point on the image plane 225 can find a corresponding viewing line 80 in the field-of-view space.

In practice, one only needs to determine the viewing lines 80 corresponding to the intersection points (which may also be referred to as calibration points) between the shapes 142 of the second pattern 16; the remaining viewing lines can be approximated by interpolation. Although the distortion in the image produced by the fisheye lens 221 is nonlinear and the degree of nonlinear distortion becomes more pronounced for larger off-axis angles, increasing the density of shapes 132 in the first pattern 13 allows the intermediate viewing lines 80 (between the calibration points) to be found by interpolation. In other words, the denser the first pattern 13, the more precise the resulting optical projection mechanism will be.

After completing step S150, the optical projection mechanism of the fisheye camera has been determined. Therefore, any image or video subsequently captured by that fisheye camera can be accurately corrected (through computational processing) back to the true undistorted scene. In this way, once corrected by the method shown in FIG. 1, a fisheye camera can be used to identify the size of real-world objects or to perform measurements. Given the low cost and wide field of view of fisheye cameras, calibrating them using the method of the present invention enables fisheye cameras to be used for measuring objects across a broad field of view. This extends the range of applications for fisheye cameras significantly—for example, a fisheye camera could be applied in autonomous driving systems or for measuring the dimensions of components inside machinery.

OTHER EMBODIMENTS

In the above description of step S110, a planar target 30 (as in FIG. 2) is used to find the fisheye camera's optical axis and projection center. However, those skilled in the art could instead use the front view surface 12 of the stereoscopic target 10 (as shown in FIG. 6) to determine the fisheye camera's optical axis and projection center, because the front view surface 12 of stereoscopic target 10 is itself a centrally symmetric pattern.

Additionally, although in the above embodiment the stereoscopic target 10 is in the shape of a cube, those skilled in the art could design the target in other shapes, for example a cylindrical shape.

Further, in the above embodiment the first pattern 13 is composed of multiple squares of identical size. This design has the advantage of convenient position determination; for instance, referring to FIG. 6, given that the size of each square shape 132 is known, it is easy to determine that the coordinates of the intersection point 132B are (6, 6, 0). However, those skilled in the art could configure the first pattern 13 in other forms, for example composed of rectangles or other regularly arranged shapes, or even as multiple positioning markers at known locations.

In the above embodiment, the shapes 132 have two colors (black and white) arranged in an alternating pattern. The high contrast between the black and white shapes 132 makes it easy to locate the intersection points, whether by naked eye or by computer recognition, and use those intersection points as calibration points. However, other colors (for example, yellow and purple) could alternatively be used for the shapes 132 with a similar effect.

It should be noted that in the stereoscopic target 10 shown in FIG. 5, the first pattern 13 covers the entire area of the front view surface 12 and the side view surfaces 14. Those skilled in the art could instead choose to dispose the first pattern 13 on only a portion of the front view surface 12 and side view surfaces 14, if desired.

Moreover, although the above embodiment specifically describes use of a fisheye lens, the method illustrated in FIG. 1 can also be applied to other types of lenses, particularly lenses whose formed images have the properties of axisymmetry and nonlinear distortion.

Differences from the Prior Art

Figure 9:
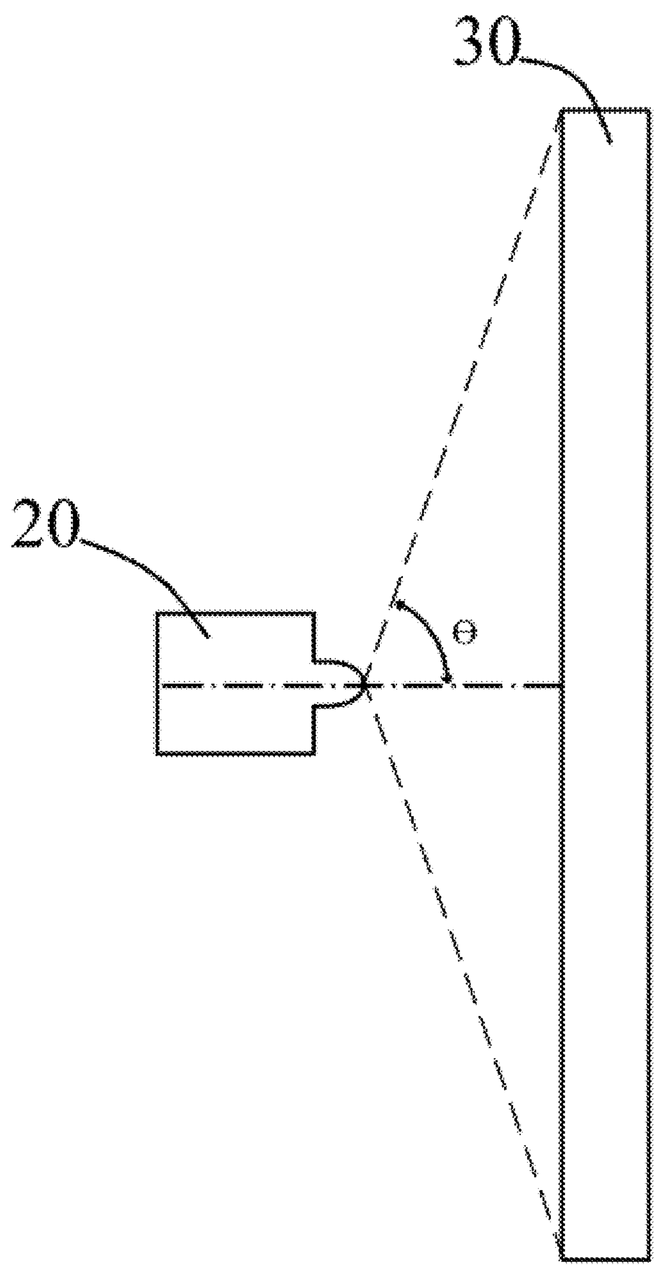
FIG. 9 and FIG. 10 show differences between the conventional technology and the present invention.
Figure 10:
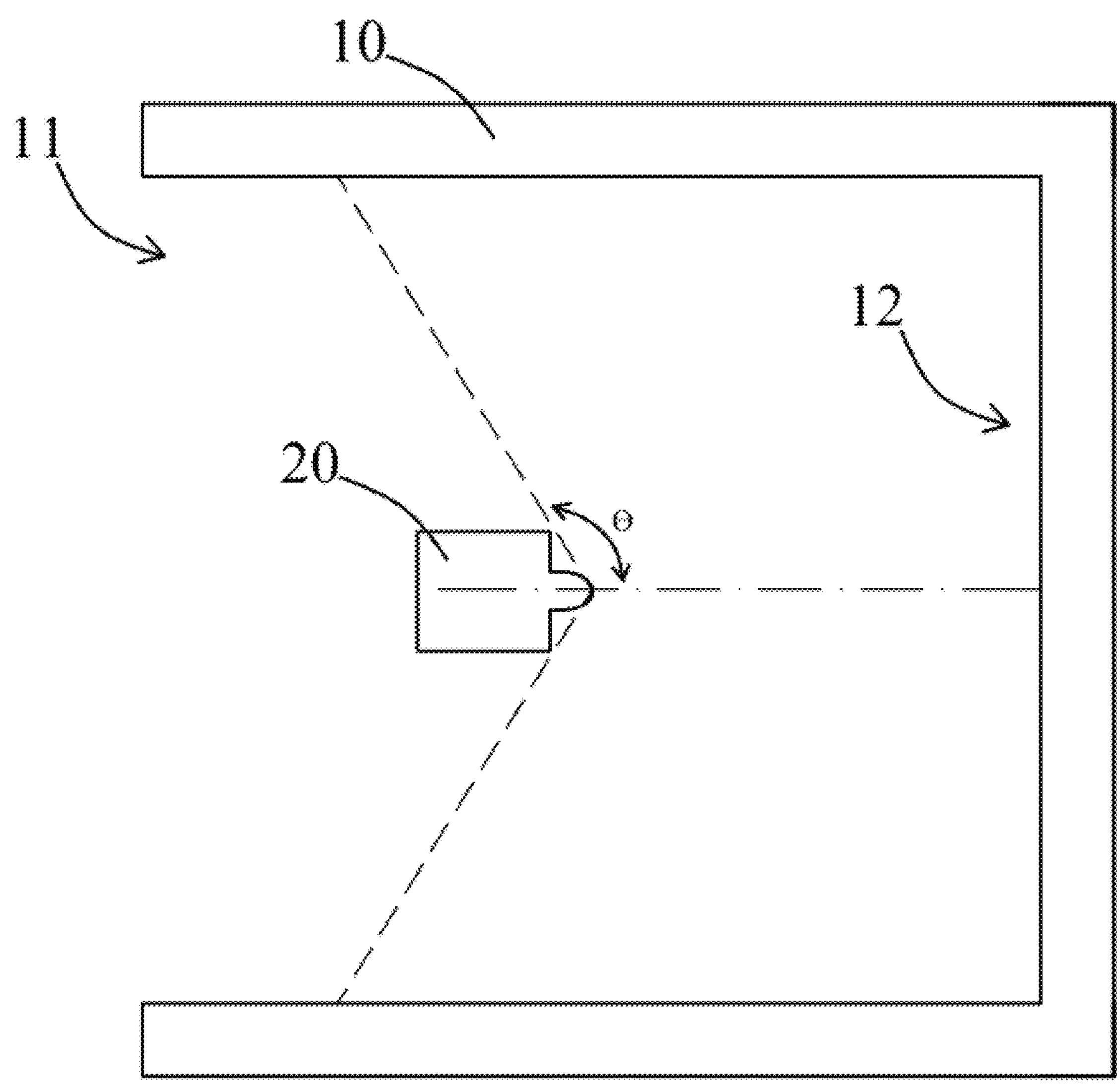

To more clearly demonstrate the differences between the present invention and the techniques disclosed in patents TW 565735, TW 565736, and U.S. Pat. No. 6,985,183, reference is made to FIG. 9 and FIG. 10. FIG. 9 and FIG. 10 show the differences between the conventional technology and the present invention. Referring first to FIG. 9, it can be seen clearly that due to the limitations of the planar target 30, even if the fisheye camera 20 is brought very close to the planar target 30, the off-axis angle θ of the viewing line 80 can only approach about 90° at best, and it is not possible to calibrate cases where the off-axis angle θ exceeds 90°. In contrast, referring to FIG. 10, by using the stereoscopic target 10, as long as the fisheye camera 20 is inserted a certain distance into the opening 11 (without needing to be extremely close to the front view surface 12), it becomes possible to calibrate situations where the off-axis angle θ exceeds 90°.

Although the present invention has been described above in conjunction with preferred embodiments, these embodiments are not intended to limit the scope of the invention. Anyone skilled in the art could make various alterations and modifications without departing from the spirit and scope of the invention. Therefore, the scope of protection of the present invention shall be defined by the appended claims.

The invention claimed is:

1. A method for obtaining a camera's optical projection mechanism, the camera including a lens and being configured to project an image of a physical object in a field-of-view space onto an image plane, the image formed by the camera having axisymmetric and nonlinear distortion properties, the method comprising:

(a) confirming an optical axis of the camera and a projection center of the camera;

(b) providing a stereoscopic target including a front view surface and at least one side view surface, wherein both the front view surface and the at least one side view surface have a first pattern;

(c) forming an image of the first pattern on the front view surface and the side view surface onto the image plane to create a second pattern;

(d) aligning the projection center of the camera with a center point of the front view surface of the stereoscopic target, and making the optical axis perpendicular to the front view surface; and (e) comparing the first pattern with the second pattern to find a corresponding relationship between the first pattern and the second pattern, thereby obtaining the optical projection mechanism of the camera.

2. The method of claim 1, wherein the first pattern is composed of a plurality of regularly arranged shapes.

3. The method of claim 1, wherein the first pattern covers the front view surface or the side view surface.

4. The method of claim 2, wherein the first pattern has a first color and a second color, each of the shapes has a color that is the first color or the second color, and the shapes of the first color and the shapes of the second color are arranged alternately.

5. The method of claim 4, wherein the first color is black and the second color is white.

6. The method of claim 5, wherein the shapes are squares.

7. The method of claim 2, wherein the stereoscopic target is a cubic box having an opening, an interior of the cubic box including the front view surface and four side view surfaces, and the opening exposing the front view surface and the side view surfaces.

8. The method of claim 1, wherein the lens is a fisheye lens.

* * * * *